United States Patent [19]

Onisawa et al.

[11] Patent Number: 5,162,810
[45] Date of Patent: Nov. 10, 1992

[54] PARABOLIC ANTENNA AND PROCESS FOR MANUFACTURING THE SAME

[75] Inventors: Yoshio Onisawa, Hyogo; Atsutoshi Wakabayashi, Nishinomiya; Hiroshi Hotta, Fuji, all of Japan

[73] Assignees: Mikuni Plastics; Yodogawa Sangyo Co., Ltd.; Polyplastics Co., Ltd., all of Osaka, Japan

[21] Appl. No.: 740,007

[22] Filed: Aug. 2, 1991

[30] Foreign Application Priority Data

Aug. 8, 1990 [JP] Japan .................. 2-212953

[51] Int. Cl.$^5$ ............................................. H01Q 15/14
[52] U.S. Cl. ................................................. 343/912
[58] Field of Search ...................................... 343/912

[56] References Cited

U.S. PATENT DOCUMENTS 4,733,246  3/1988  Rubin et al. .................. 343/912
4,763,133  8/1988  Takemura et al. ............. 343/912
4,789,868 12/1988  Oono et al. .................... 343/912

Primary Examiner—John D. Lee
Assistant Examiner—Robert E. Wise
Attorney, Agent, or Firm—Cohen, Pontani, Lieberman, Pavane

[57] ABSTRACT

A process for manufacturing a parabolic antenna, which comprises arranging, in an injection mold beforehand, a thin sheet comprising a film layer having good weather resistance and a radio-reflecting layer coated with said film layer, and heat-plasticating a pellet-type thermoplastic resin composition with an injection molding machine to inject into the mold, whereby the parabolic antenna is integrally molded, said pallet-type thermoplastic resin composition comprising a fibrous inorganic filler which has a length substantially the same as a thermoplastic resin pellet and arranged approximately parallel to the longitudinal direction of said pellet.

2 Claims, 3 Drawing Sheets

PARABOLIC ANTENNA AND PROCESS FOR MANUFACTURING THE SAME

BACKGROUND OF THE INVENTION (a) Field of the Invention

The present invention relates to a parabolic antenna used for receiving satellite broadcasting and a process for manufacturing the same.

(b) Description of the Prior Art

Typically the main body of a conventional parabolic antenna is manufactured by a sheet molding compound (SMC) method using fiber reinforced plastics (FRP). Specifically, the SMC method includes inserting into a mold a metal mesh which serves as a radio-reflecting member, putting thereon a glass fiber reinforced polyester resin sheet and applying heat and pressure thereto by a press and thereby form a specified shape. Thereafter, a protective coat is applied onto the mesh surface for commercial use.

However, the production process by SMC method is complicated and requires a long time period for processing, thereby rendering it unsuitable for mass-production. The obtained product is heavy in weight due to large specific gravity, resulting in an increased likelihood that the product will fall at the time of installment or during a storm.

In recent years, a main body of a parabolic antenna has been sold which has been manufactured by injection molding using a thermoplastic resin. However, the thermoplastic resin used as a material is low in modulus of elasticity which can cause deformation by the wind. This raises a problem of increasing profile irregularities on the radio-reflecting surface and decreasing reflecting properties. Accordingly, the main body should be made thick, which entails various disadvantages of requiring a long period of molding time, increasing manufacturing cost, rendering the product heavy or the like.

In view of these problems, another prior art product is manufactured by a foam molding or by using thermoplastic resin reinforced with short fiber glass for accomplishing weight-saving. However, such a product is unsatisfactory in mechanical strength. In other words, weight-saving with a thin body cannot be accomplished. The radio-reflecting member, except for those manufactured by FRP utilizes conductive coating. Such a radio-reflecting member varies in reflectivity depending upon the thickness of the coating. Consequently, there remains the unsolved at present about problem of uneven quality of the products, insufficient bonding strength of the conductive coating, and the occurrence of debonding due to shock against the coating surface.

The present invention has been accomplished in view of the above-mentioned problems, and aims to provide a parabolic antenna which is inexpensive to produce, light-weight and excellent in weather resistance and also provide a process for manufacturing the same.

SUMMARY OF THE INVENTION

The present invention provides a process for manufacturing a parabolic antenna which comprises arranging, in an injection mold beforehand, a thin sheet comprising a film layer having good weather resistance and a radio-reflecting layer coated with said film layer, and heat-plasticating a pellet-type thermoplastic resin composition with an injection molding machine to inject into a mold, whereby the parabolic antenna is integrally molded, said pellet-type thermoplastic resin composition comprising a fibrous inorganic filler which has a length substantially the same as a thermoplastic resin pellet and arranged approximately parallel to the longitudinal direction of said pellet.

From another viewpoint, the present invention provides a parabolic antenna which comprises a thin sheet comprising a film layer having good weather resistance and a radio-reflecting layer coated with said film layer, and a thermoplastic resin layer integrally molded on a surface of the thin sheet which is not coated with the film layer, said thermoplastic resin layer comprising a pellet-type thermoplastic resin composition including a fibrous inorganic filler which has a length substantially the same as a thermoplastic resin pellet and arranged approximately parallel to the longitudinal direction of said pellet.

The process for manufacturing a parabolic antenna according to the present invention can supply a large number of parabolic antennas which are inexpensive to produce, light-weight and excellent in weather resistance.

BRIEF DESCRIPTION OF THE DRAWINGS

Embodiments of the invention will now be described by way of example and with reference to the accompanying drawings, in which.

THE PREFERRED EMBODIMENTS OF THE INVENTION

Figure 1:
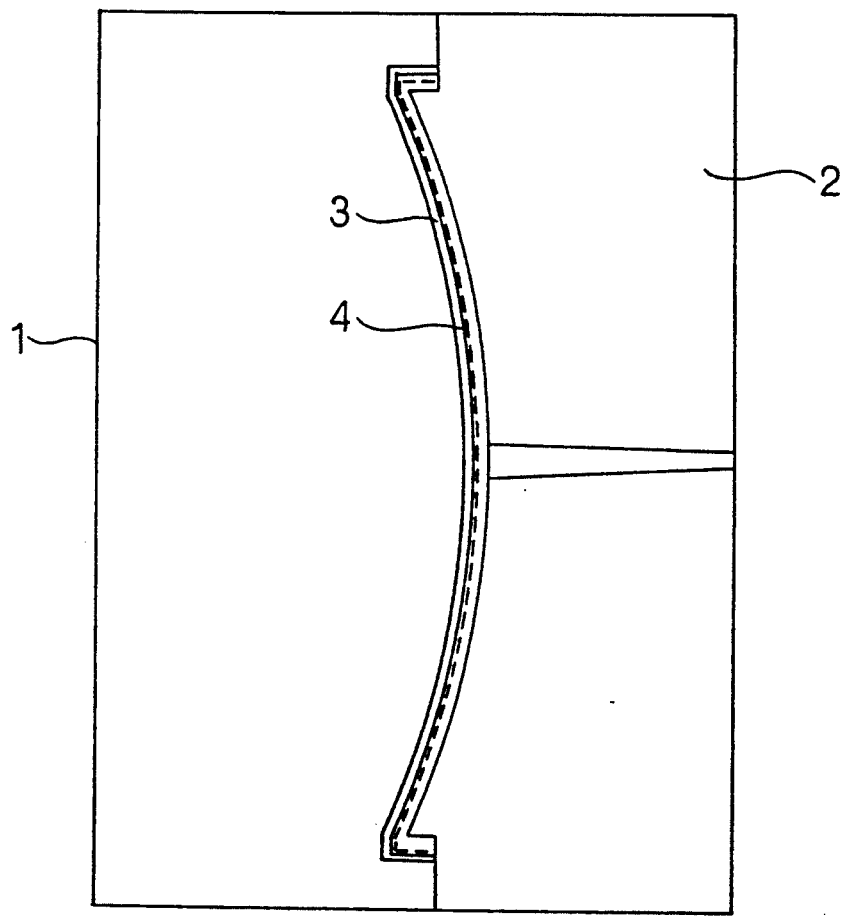
FIG. 1 is an explanatory view showing that a weather resistance film and a radio-reflecting member which are molded by vacuum formation into a specified shape are inserted into an injection mold.

First explained is the pellet-type thermoplastic resin composition used for performing injection molding to form the main body of a parabolic antenna according to the present invention.

The pellet-type thermoplastic resin composition used herein comprises a thermoplastic resin and a fibrous filler and is characterized in that the fibrous filler is arranged approximately parallel to the longitudinal direction of a pellet of thermoplastic resin with the length substantially the same as that of the pellet.

The thermoplastic resin composition having the above-mentioned specific structure can be obtained by, for example, a pultrusion. Specifically, a continuous inorganic strand or filament fiber is drawn, while being impregnated into an impregnating bath or impregnated by a crosshead die into a melt, emulsion or solution of the resin. Subsequently, the resultant fiber is shaped into a specific profile, cooled and then cut into a predetermined length, whereby the pellet-type thermoplastic resin composition can be obtained which is reinforced with a long fiber and has a fiber arranged parallel to the pellet of the resin with the length substantially the same as that of the pellet.

Examples of the thermoplastic resins used herein are styrene resins such as acrylonitrile-butadiene-styrene (ABS) resin, AES resin which is a copolymer made of acrylonitirile (A), EPDM (E) and styrene (S), methyl-methacrylate-butadienestyrene (MBS) resin, high impact polystyrene (HI-PS) resin or the like, polymethylmethacrylate (PMMA) resin, polyphenyleneoxide (PPO) resin, modified PPO resin, polycarbonate (PC) resin or polyurethane (PUR) resin or composite resin thereof. In view of weather resistance, AES resin is more preferable. Although no limitation is made to the incorporated inorganic fibrous filler, a glass fiber is preferable in view of availability of the continuous fiber and its costs.

The resin composition used in the present invention contains the fibrous filler in an amount of 10 to 80 wt.%. If the amount of the fibrous filler is less than 10 wt.%, the resin composition has insufficient strength and rigidity, so that a light-weight parabolic antenna with a thin body cannot be obtained. Further, profile irregularities increase on the radio-reflecting surface. The amount of the fibrous filler more than 80 wt.% degrades the injection molding properties of the parabolic antenna. The amount of the fibrous filler to be contained is preferably 15 to 65 wt.%, more preferably 20 to 40 wt.% of the composition. The fibrous filler may be treated with a binder or a surface treatment.

The thermoplastic resin composition used for injection molding according to the present invention is a pellet-type one having a length of 2 to 50 mm. In other words, the length of the incorporated fiber is substantially the same as that of the pellet of the resin, i.e., 2 to 50 mm. This length is remarkably long compared with the average fiber length (approximately 300 to 500 $\mu$m) of the composition obtained by a typical fiber reinforcing method in which a chopped strand or the like is mixed and extruded. When the thermoplastic resin composition having a pellet length (fiber length) of less than 2 mm is used for performing injection molding, it is difficult to afford satisfactory strength and rigidity to the parabolic antenna. On the other hand, the thermoplastic resin composition having a pellet length of more than 50 mm makes it difficult to perform injection molding. Preferably, the pellet length of the resin composition is 4 to 30 mm.

The resin composition used for injection molding according to the present invention has added thereto a known compound generally incorporated into thermoplastic resin, such as a stabilizing agent (anti-oxidant or ultraviolet light absorber), a flame retarder, a plasticizer, a promoter for crystallization, a nucleating agent, an antistatic agent, a colorant, sheet- or powder-filler or the like, if necessary.

Subsequently explained is a weather resistance film used for the surface of the parabolic antenna.

Such a film is a composite resin composition comprising a polymer of methacrylate ester or polymer of acrylic ester and polyvinyl chloride (PVC) resin. The composition ratio of the polymer of methacrylate ester or polymer of acrylic ester to PVC is 50:50 wt.% to 99:1 wt.%. Considering vacuum molding properties of the parabolic antenna and fabricating properties by heat press, the PVC is made composite.

The film can be obtained by calendering. Specifically, the composite resin pellet comprising the polymer of methacrylate ester or polymer of acrylic ester and PVC is fused by an extruder. Subsequently, the film extruded from the T-die is adjusted with a roll to have a predetermined thickness. Preferable resin composition used herein is the one comprising PMMA as a matrix and PVC.

When the parabolic antenna is integrally molded, an amount of the PVC more than 50% remarkably reduces softening temperature. As a result, a radio-reflecting member described hereinbelow is damaged due to the temperature of the injected resin and flow resistance. Incorporation of a little amount of PVC is necessary in order to improve film-forming properties and fabrication quality of the film. The ratio of the polymer of methacrylate ester or polymer of acrylic ester to PVC is 60:40 wt.% to 95:5 wt.%, more preferably 75:25 wt.% to 90:5 wt.%.

The thickness of the weather resistance film used in the present invention is within the range of 10 to 3,000 $\mu$m. When having the film thickness of less than 10 $\mu$m, the film has unsatisfactory weather resistance and has no effect for protecting the reflecting member such as metal mesh. On the other hand, the film thickness of more than 3,000 $\mu$m renders the parabolic antenna heavy-weight and expensive, thus undesirable. Preferably, the film thickness is 30 to 2,000 $\mu$m, more preferably 40 to 1,000 $\mu$m.

The resin composition serving as a film according to the present invention has added thereto a known compound generally incorporated for manufacturing the film, such as a stabilizing agent (anti-oxidant or ultraviolet light absorber), a flame retarder, a plasticizer, a colorant, an anti-static agent or the like, if necessary.

Materials used as the radio-reflecting member include a metal mesh, metal foil, conductive coating film or the like. Examples of the metal mesh are conductive ones such as copper, aluminum, brass or the like. The mesh range is preferably 10 to 150 mesh, more preferably 20 to 120 mesh, and most preferably 40 to 120 mesh. The parabolic antenna having the mesh range of less than 10 mesh cannot afford an excellent image. If the mesh range exceeds 150 mesh, corrosion resistance remarkably degrades and profile irregularities on the radio-reflecting surface increase since the resin used for molding is not impregnated.

Although the metal foil to be used may be thin, the thickness thereof is preferably within the range of 20 to 1,000 $\mu$m considering film-forming properties. The metal foil having the thickness of either less than 20 $\mu$m or more than 1,000 $\mu$m is undesirable in view of fabrication quality and molding properties. Preferably, the thickness thereof is 40 to 200 $\mu$m.

Usable conductive coating film is the one made of a resin composition comprising conductive powders such as copper or nickel. Excellent reflecting properties can be obtained with the conductive coating film of copper or nickel film having a thickness more than 30 $\mu$m. In this case, copper or nickel powders are generally contained in the conductive film in an amount of 60 to 70 wt.%.

The main body of the parabolic antenna prepared according to the above-mentioned method has attached thereto various components such as a support material, lead wire or the like to be produced as a commercialized parabolic antenna.

The present invention will specifically be described hereinbelow with reference to Examples. However, the present invention shall not be limited to these Examples.

EXAMPLE 1

A film, which comprises PMMA and PVC with the ratio of the former to the latter being 75 to 25 wt.% and has a thickness of 300 $\mu$m, was subjected to vacuum forming to have a specified shape. The resultant film has laminated thereon a brass wire gauge of 40 mesh, which was then inserted into a mold for forming a main body of a parabolic antenna having a diameter of 45 cm and a thickness of 3 mm. Subsequently, a pellet-type AES resin composition with the length of 12 mm comprising a glass fiber of 25 wt.% (its length: substantially 12 mm) obtained by pultrusion was injected for injection molding to form the main body of the parabolic antenna.

The break strength of the main body of the obtained parabolic antenna was measured to be 275 kgf. The break strength calculated from the obtained value at the wind velocity of 60 m/sec. was 74 kgf. Therefore, it is understood that the obtained parabolic antenna has satisfactory break strength.

EXAMPLE 2

A copper conductive coating film was applied on a film which comprises PMMA and PVC with the ratio of the former to the latter being 85 to 15 wt.% and has a thickness of 300 µm. Thereafter, the resultant film was subjected to vacuum forming and then inserted into the mold used in Example 1. Subsequently, a pellet-type AES resin composition with the length of 12 mm comprising a glass fiber of 25 wt.% obtained by pultrusion was injected for injection molding to form a main body of a parabolic antenna.

The obtained product was excellent and observed to have a break strength of 256 kgf.

EXAMPLE 3

By the same manner as in Examples 1 and 2, a film, which comprises PMMA and PVC with the ratio of the former to the latter being 90 to 10 wt.% and has a thickness of 300 µm, was subjected to vacuum forming to have a specified shape. The resultant film has laminated thereon a brass wire gauge of 50 mesh, which was then inserted into a mold for forming a main body of a parabolic antenna having a diameter of 45 cm and a thickness of 3 mm. Subsequently, a pellet-type AES resin composition comprising a glass fiber of 30 wt.% was injected for injection molding to form the main body of the parabolic antenna.

The obtained product was excellent and observed to have a break strength of 3,290 kgf.

Each of the Examples 1 to 3 will be explained hereinbelow low with reference to the drawings.

Figure 2:
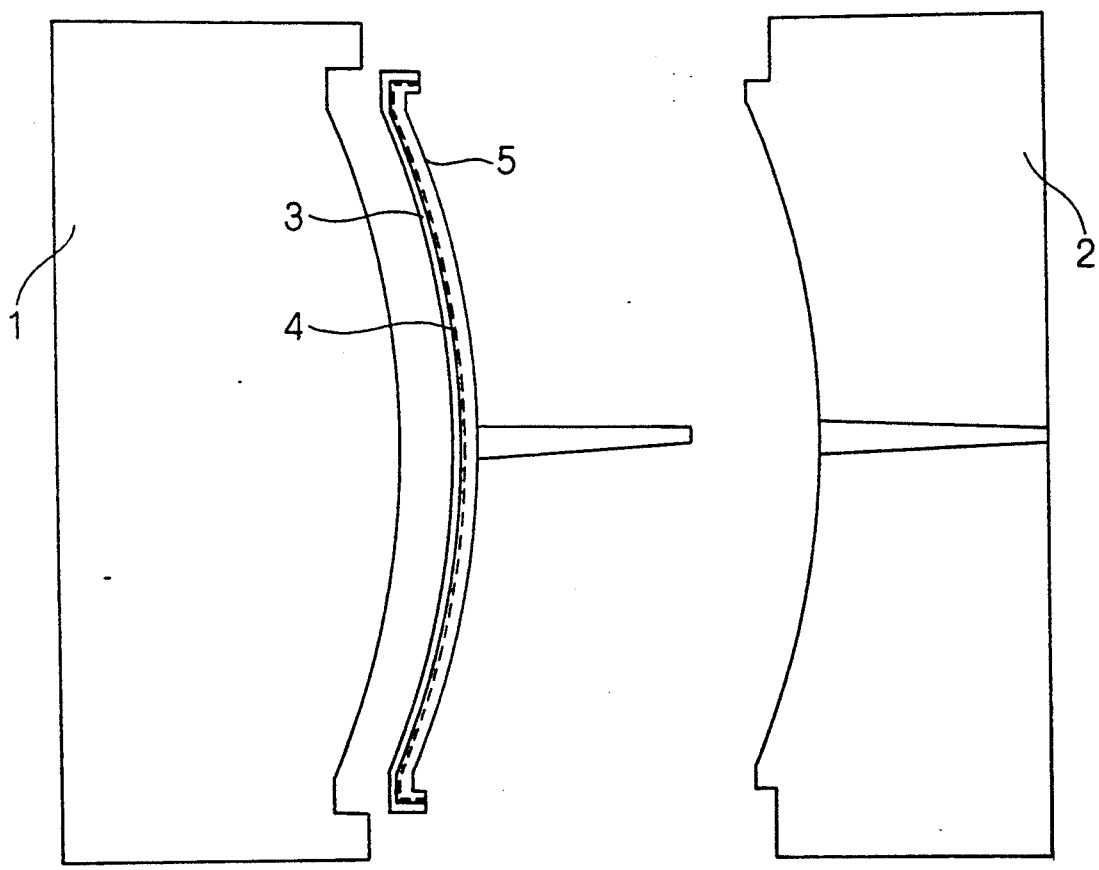
FIG. 2 is an explanatory view showing how to remove the parabolic antenna formed by injection molding.
Figure 3:
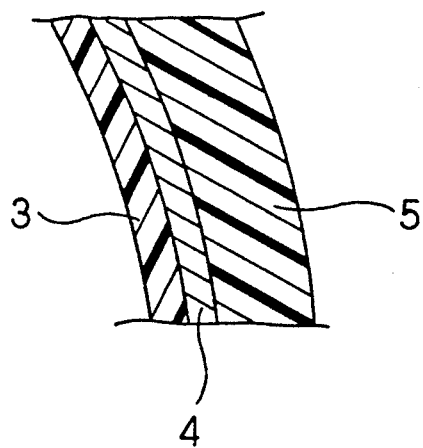
FIG. 3 is a partially enlarged cross-sectional view of the resultant parabolic antenna.

A weather resistance film 3 and a conductive material such as a metal mesh 4 are inserted into injection molds 1 and 2 for forming a main body of a parabolic antenna (see FIG. 1). Subsequently, pellet-type thermoplastic resin 5 comprising fibrous inorganic filler was injected into the molds 1 and 2 for injection molding. After cooled for a predetermined period, the molded product was removed (see FIG. 2). FIG. 3, which shows a cross-sectional view of the molded product, discloses that the weather resistance film 3, conductive material 4 and thermoplastic resin 5 comprising fibrous inorganic fillers are firmly adhered to one another, so that a parabolic antenna is integrally molded.

What is claimed is:

1. A method of integrally forming a parabolic reflecting antenna in an injection mold, comprising the steps of:
   (a) coating a layer of radio-reflective film comprising at least one of a metal wire mesh, a metal foil and a conductive film, with a thin layer of weather resistant film having a thickness of about 10 to 3,000 µm, the weather resistant film comprising a composite resin, the composite resin having a composition ratio of at least one of a polymer of methacrylate ester and a polymer of acrylic ester to polyvinyl chloride in a range of about 50:50 weight percent to about 99:1 weight percent;
   (b) inserting the coated, radio-reflective film in an injection molding apparatus, the molding apparatus comprising a mold of a predetermined shape defining a parabolic antenna;
   (c) heat-plasticating a pellet-type thermoplastic resin composition comprising a fibrous inorganic filler, the pellet having a length and a longitudinal axis, the thermoplastic resin composition comprising at least one of an acrylonitrile-butadiene-styrene resin, a methylmethacrylate-butadiene-styrene resin, a copolymer of acrylonitrile EPDM styrene resin, a high-impact polystyrene resin, a polymethylmethacrylate resin, a polyphenyleneoxide resin, a modified polyphenyleneoxide resin, a polycarbonate resin and a polyurethane resin, the inorganic filler comprising a glass fiber having a length of about 2 to 50 mm, the glass fiber being contained within the pellet in an amount of about 10 to 80 weight percent and oriented in substantially parallel relation to the longitudinal axis of the pellet and having a length substantially equal to the length of pellet; and
   (d) injecting the plasticated thermoplastic resin of step (c) into said injection molding apparatus to mold a parabolic antenna of predetermined shape and integrally formed of a first weather-resistant layer, a second radio-reflective layer, and a third thermoplastic layer.

2. A parabolic antenna integrally formed of a first weather-resistant layer, a second radio-reflective layer, and a third thermoplastic layer, the antenna being formed by the steps of:
   (a) coating a layer of radio-reflective film comprising at least one of a metal wire mesh, a metal foil and a conductive film, with a thin layer of weather resistant film having a thickness of about 10 to 3,000 µm, the weather resistant film comprising a composite resin, the composite resin having a composition ratio of at least one of a polymer of methacrylate ester and a polymer of acrylic ester to polyvinyl chloride in the range of about 50:50 weight percent to about 99:1 weight percent;
   (b) inserting the coated radio reflective film in an injection molding apparatus, the molding apparatus comprising a mold of a predetermined shape defining a parabolic antenna;
   (c) heat-plasticating a pellet type thermoplastic resin composition comprising a fibrous inorganic filler, the pellet having a length and a longitudinal axis, the thermoplastic resin composition comprising at least one of an acrylonitrile-butadiene-styrene resin, a methylmethacrylate-butadiene-styrene resin, a copolymer of acrylonitrile EPDM styrene resin, a high-impact polystyrene resin, a polymethylmethacrylate resin, a polyphenyleneoxide resin, a modified polyphenyleneoxide resin, a polycarbonate resin and a polyurethane resin, the inorganic filler comprising a glass fiber having a length of about 2 to 50 mm, the glass fiber being contained within the pellet in an amount of about 10 to 80 weight percent and oriented substantially parallel to the longitudinal axis of the pellet and having a length substantially equal to the length of pellet; and
   (d) injecting the plasticated thermoplastic resin of step (c) into said injection molding apparatus to mold an integrally formed, parabolic antenna of said predetermined shape.

* * * * *